Sept. 6, 1955  N. HAGEN  2,716,777

MANUFACTURE OF SHRINKABLE TUBES

Filed Aug. 14, 1951

INVENTOR.
Norbert Hagen
BY
AG'T

United States Patent Office 2,716,777
Patented Sept. 6, 1955

2,716,777

MANUFACTURE OF SHRINKABLE TUBES

Norbert Hagen, Siegburg, Rhineland, Germany

Application August 14, 1951, Serial No. 241,870

6 Claims. (Cl. 18—19)

This invention relates to the manufacture of shrinkable tubes, and more particularly to an apparatus for the manufacture of such tubes from thermoplastic material.

The primary object of my invention is to generally improve the manufacture of shrinkable tubes from thermoplastic material.

Such tubes are slipped over an object that they are intended to cover, and then shrunk by heating them to their softening temperature. To prepare the tubes for this purpose they are first heated to the softening point, then expanded to the desired degree by pressure applied internally, and finally cooled, while in their expanded shape, to such a temperature that they will not shrink immediately to their previous diameter when the pressure is released.

One object of my invention is to simplify, cheapen and speed up the manufacture of shrinkable tubes made from thermoplastic material, and still another object is to provide an apparatus by means of which continuous shrinkable tubes can be produced from thermoplastic material in a simple, quick and convenient way.

To the accomplishment of the foregoing and other objects which will hereinafter appear, my invention consists in the apparatus elements and their relation one to the other, as hereinafter are more particularly described in the specification and sought to be defined in the claims. The specification is accompanied by a drawing in which:

Figure 3:
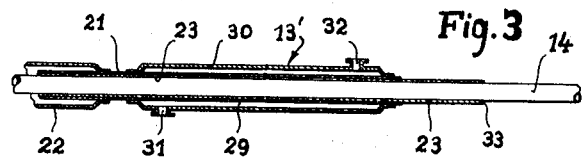
Fig. 3 is a longitudinal section of another detail, the cooling channel, drawn to the same enlarged scale.

Referring to the drawing in detail, a tube 10 is unwound from a reel or drum 11. The expansion of the tube, which will be discussed in greater detail further below, takes place in a heating zone 12. After expansion, cooling to normal temperature or at least a temperature substantially below the softening point is achieved in a zone 13 either by air cooling of the expanded tube 14 or by cooling in a special device as shown in Fig. 3. The finished expanded tube is then wound up on a reel 15.

Pressure fluid for expanding the tube is introduced from the free end of the expanded or widened tube 14 through a pedal-actuated valve 16 and a pipe 17, the latter being tightly connected to a rotatable hollow shaft 18 of the reel 15. The tube 14 is connected to the pressure line 16, 17 and 18 through a compressed air nozzle 19.

My apparatus is operated by an operator 20 who sits between the expanding and cooling zones 12, 13 and the reel 15. The operator's job is to control the temperatures in the heating zone 12 and cooling zone 13 and to pull the tube 10, 14, after reversing the valve 16, a certain length through the apparatus and to wind the tube up on the reel 15. The rate at which the tube 10, 14 is moved through the apparatus will depend on the wall thickness and nature of the material of the tube 10, 14 and upon the temperature in the expansion zone 12.

The heating of the tube in the heating zone 12 takes place within the heating pipe 21 which is surrounded by a tightly fitting heating jacket 22. Within the heating pipe 21 is a pipe 23 of a textile material, which pipe 23 is clamped to the narrow end 21a of the heating pipe 21, for instance, by inserting the end 21a between the body of the pipe 23 and a backward bent 24. The textile pipe 23 has at its front end 23a an internal diameter which corresponds approximately to the external diameter of the normal tube 10 fed into the apparatus. The pipe 23 expands conically at 23b until it reaches the diameter 23c. There it lies tightly on the internal wall of the heating pipe 21.

Figure 1:
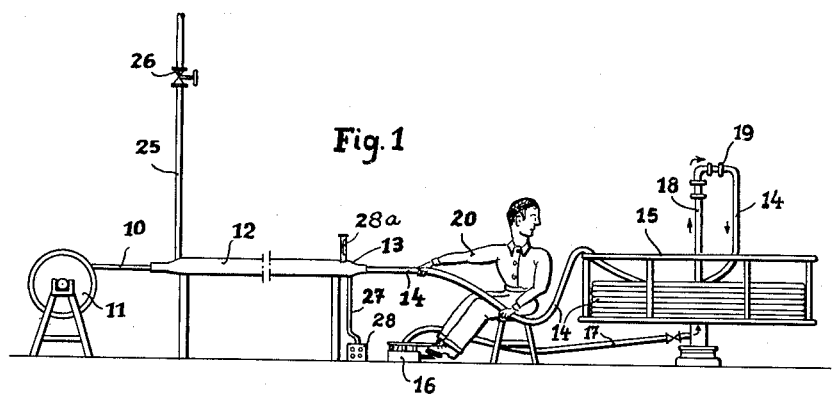
Fig. 1 illustrates schematically an apparatus for the manufacture of shrinkable tubes from thermoplastic material, embodying features of my invention.
Figure 2:
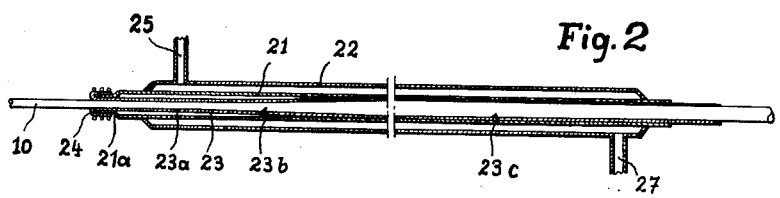
Figure 2 is a longitudinal section of a detail, namely, the heating device, drawn to enlarged scale.

The heating space formed by the pipe 21 and the jacket 22 is connected to a steam line at 25. The steam supply is controlled by a valve 26 (Fig. 1). The condensate which forms upon cooling is removed through a line 27 and a trap 28. A thermometer 28a permits close control of the temperature within the heating device.

The cooling device 13' (Fig. 3) is designed similarly to the heating device. The cooling pipe 29 the diameter of which corresponds to that of the widest section of the heating pipe 21 is surrounded by a jacket 30 which fits tightly at its ends. The cooling fluid, e. g. water, enters at 31 and is withdrawn at 32. The cooling action is controlled by a valve which is not shown. The textile tube 23 extends through the cooling pipe 29 and terminates at 33, i. e., a place before which the expanded tube 14 has left the cooling zone 13.

The length of the narrow cylindrical portion 23a of the textile pipe 23, the length of its conical portion 23b and the length of the large diameter portion 23c will depend on special requirements and more particularly the material to be worked, its wall thickness, and the degree of the desired widening. Usually the narrow portion 23a of the textile pipe extends over ¼ of the length of the heating zone 12. The conical portion 23b may be of equal length, and the wide cylindrical portion 23c may occupy the remaining half of the heating zone. The cooling pipe 29 is of about the same length as the heating pipe.

It will be understood by those skilled in the art that, according to my invention, a tube with the starting dimensions is heated in a heating channel the internal width of which increases from the entrance to the exit end, and that the heated tube is expanded by internally applied pressure, and finally cooled, while in the dilated shape, in a cooling zone following the heating channel. During this treatment, one end, preferably the rear end, of the tube is closed whereas the pressure fluid which causes the dilatation of the tube is introduced through the open end of the tube portion already expanded. The cooling device may consist of a channel which is surrounded by a cooling fluid. With very thin-walled tubes, a separate cooling channel is not always necessary. In the latter case jets of cold air directed against the tube itself achieve the removal of excess heat within a sufficiently short time.

To avoid local overheating of the work, I prefer to line the inner walls of the heating channel with a textile pipe which may consist, for instance, of a course sacking. Such sackcloth permits air to escape when the tube is expanded. I further prefer to give the textile pipe a conical shape that conforms to the desired tube expansion so that the textile pipe at its front end will have an internal diameter equal to, or slightly larger than, the external diameter of the normal tube which is introduced into the process. The rear end of the textile pipe, the internal diameter of which corresponds to the desired external diameter of the tube, is preferably extended through the cooling zone. This safeguards the tube against local overheating during the entire forming operation and also prevents expansion of the tube beyond the desired diameter. The same heating channel may be used for the manufacture of tubes of different diameters by using textile pipes of corresponding diameters.

The normal tubing may be continuously fed from a reel, and the dilated tube may be wound up on a take-up reel. The pressure line is preferably connected with the free end of the expanded tube through the shaft of the take-up reel. Within reach of the operator who stands behind the expanding device I prefer to install the necessary controls for the introduction of the pressure fluid into the tube and the reduction of pressure.

To practice my invention, it will also be understood that the starting tube is drawn through the heating channel where it is heated by means of steam, hot oil, electric current, or in any other suitable way to the softening temperature of the thermoplastic material of the tube. Compressed air is then introduced into the tube and expands the tube to the diameter of the textile pipe provided within the heating channel. As soon as the desired expansion is securely achieved along the entire length of the heating channel, the internal pressure is released. The tube, thereupon, slightly contracts and can, therefore, be pulled through the textile pipe without any difficulty. The tube portion which has previously been widened is now in the cooling zone. When pressure is again applied to the tube, the tube portion in the cooling zone is again widened to the internal diameter of the textile pipe, while in the heating zone the succeeding tube portion is simultaneously expanded to the desired larger diameter. In the cooling zone, the temperature of the work is quickly reduced so that there is no elastic shrinkage to the diameter of the starting tube. This sequence of operations is repeated over and over again. One section after the other is expanded in the heating zone and thereafter cooled in the cooling zone to a sufficiently low temperature so that it will keep its expanded shape.

It will be apparent that while I have shown and described my invention in a preferred form, many changes and modifications may be made without departing from the spirit of the invention defined in the following claims.

I claim:

1. Method for the manufacture of heat shrinkable tubing from preformed thermoplastic tubing, comprising feeding a section of continuous tubing of a diameter smaller than the desired diameter into a heating and forming zone, interrupting the feeding, heating said section above the softening point of the thermoplastic material, expanding said section to the desired diameter by interiorly applying fluid pressure, releasing the pressure, advancing the expanded tubing section into a cooling zone while simultaneously feeding a fresh tubing section into said heating and forming zone, again applying expansive pressure, rapidly cooling the section received in the cooling zone while the fresh tubing section is subjected to heating and expanding, and repeating the cycle.

2. In the method according to claim 1, introducing fluid under pressure into the tubing sections in the heating and forming zone and in the cooling zone, and maintaining said fluid pressure both during heating and forming and during cooling.

3. Apparatus for the manufacture of heat-shrinkable tubing from preformed thermoplastic tubing of a diameter smaller than the diameter intended for the shrinkable tubing, comprising a longitudinally extending heating and forming device, said device including a forming tube of textile material, adapted for the passage of the tubing therethrough, the forming tube having at its entrance end an internal diameter approximating the external diameter of the starting tubing, and at its exit end an internal diameter approximately equaling the desired external diameter of the shrinkable tubing, and consisting of a widening portion and a cylindrical portion, said widening portion increasing in diameter between the entrance end and a point intermediate the entrance end and the exit end, the cylindrical portion extending between the said point and the exit end, the apparatus further comprising a double-walled heating jacket surrounding the entire length of the forming tube, means to introduce fluid pressure into the tubing to expand same when heated, and means to release said fluid pressure, the inner wall of the heating jacket cylindrically enclosing both portions of the forming tube, thus leaving a free space between itself and said widening section.

4. In the apparatus according to claim 3, a cooling device, the latter device including a cooling pipe, and a cooling jacket surrounding the cooling pipe, the cooling pipe having substantially the same diameter as said inner wall of the double-walled heating jacket.

5. In the apparatus according to claim 4, the cooling pipe and the inner wall of the double walled heating jacket being substantially of the same length.

6. In the apparatus according to claim 4, said textile tube extending beyond the heating and forming device and passing through the cooling device, and being adapted to permit the expanded tubing to pass therethrough.

References Cited in the file of this patent

UNITED STATES PATENTS

| | | |
|---|---|---|
| 2,047,554 | Fischer | July 14, 1936 |
| 2,307,817 | Austin | Jan. 12, 1943 |
| 2,494,273 | Wigal | Jan. 10, 1950 |

FOREIGN PATENTS

| | | |
|---|---|---|
| 524,777 | Great Britain | Aug. 14, 1940 |